United States Patent [19]

Inoue

[11] Patent Number: 4,866,237
[45] Date of Patent: Sep. 12, 1989

[54] METHOD OF DISCHARGE COATING AND AN APPARATUS THEREFOR

[75] Inventor: Kiyoshi Inoue, Tokyo, Japan

[73] Assignee: Inoue-Japax Research Inc., Kanagawa, Japan

[21] Appl. No.: 533,855

[22] Filed: Sep. 20, 1983

[30] Foreign Application Priority Data

Sep. 21, 1982 [JP] Japan ................... 57-163246
Sep. 21, 1982 [JP] Japan ................... 57-163246

[51] Int. Cl.⁴ .............................. B23K 9/04
[52] U.S. Cl. .................................. 219/76.13
[58] Field of Search ....................... 219/76.13

[56] References Cited

U.S. PATENT DOCUMENTS

| | | | |
|---|---|---|---|
| 3,098,150 | 7/1963 | Inoue | 219/76.13 |
| 3,277,266 | 10/1966 | Blaszkowski | 219/76.13 |
| 3,277,267 | 10/1966 | Blaszkowski | 219/76.13 |
| 3,832,514 | 8/1974 | Antonov | 219/76.13 |
| 4,226,697 | 10/1980 | Antonov et al. | 219/76.13 |
| 4,346,281 | 8/1982 | Inoue | 219/76.13 |
| 4,405,851 | 9/1983 | Sheldon | 219/76.13 |

Primary Examiner—Clifford C. Shaw
Attorney, Agent, or Firm—Roberts, Spiecens, & Cohen

[57] ABSTRACT

A discharge coating apparatus comprises an assembly for applying a vibrational motion in the longitudinal direction of an electrode while applying a voltage pulse in synchronization with the vibration to cause electrical discharge between the surface of a workpiece and the electrode and the formation of a coating layer on the workpiece of the material of the electrode due to the heat produced by the electrical discharge. An additional motion is applied to the electrode to cause the electrode to undergo reciprocal travel towards and away from the suirface of the workpiece at an angle relative thereto. The additional motion can be a rotational motion. The electrode can be formed with a concave portion at its tip or with an axial bore so that only an annulus of the electrode contacts the workpiece. The additional motion can be a skipping movement by utilizing a skipping mechanism consisting of an elastic memebr.

29 Claims, 9 Drawing Sheets

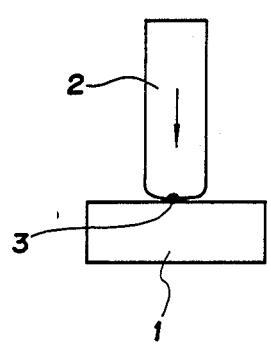
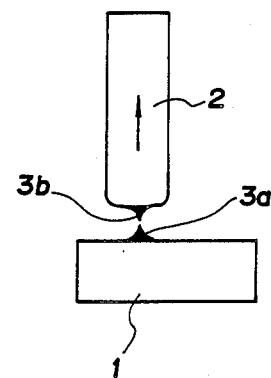
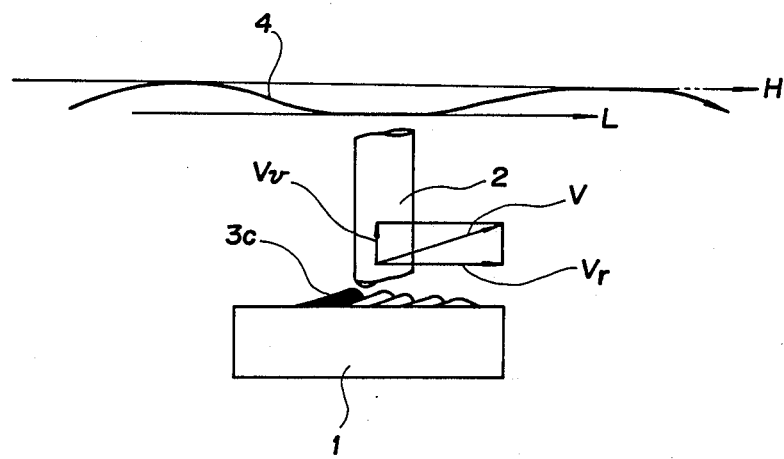

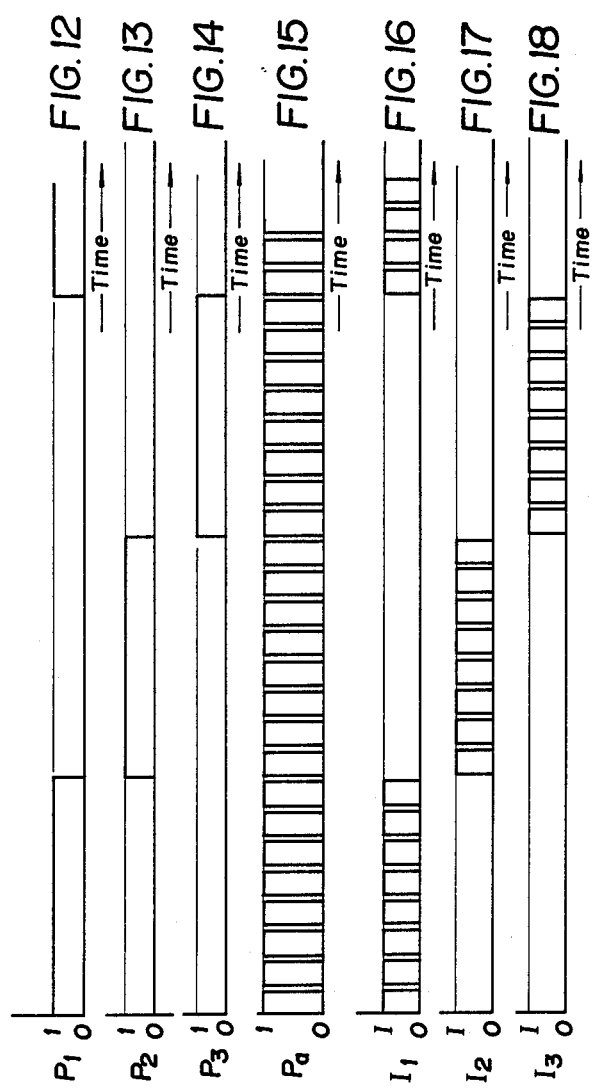

METHOD OF DISCHARGE COATING AND AN APPARATUS THEREFOR

FIELD OF THE INVENTION

This invention relates to a method of and an apparatus for discharge coating and, more particularly, to an improved method of and an apparatus for discharge coating by which a smooth, thick, rigid, and flawless coating layer can be obtained in a short time.

BACKGROUND OF THE INVENTION

In a conventionally well known discharge coating apparatus, a suitable voltage pulse is applied between a coating material electrode and a workpiece, and a vibration such as to break the surface of the workpiece at its point is also applied to this electrode synchronously with that pulse. Thus, an electric discharge occurs between the electrode and the workpiece surface, and a portion of the coating material electrode is fused due to the heat produced at this time and is melt-adhered on the workpiece surface, thereby forming a coating layer.

Discharge coating apparatuses are generally constituted as a handy-type tool. The point of the coating material electrode of such apparatus is relatively moved along the workpiece surface, thereby coating a desired portion on the workpiece surface.

As the coating material electrode, various metals and alloy materials are selected in accordance with the purpose of coating, as well as a wear resistant sintered hard alloy, corrosion resisting alloy, fire resisting alloy, etc, which are generally formed into a wire- or rod-shaped, are used. This discharge coating apparatus is provided with a chuck which can co-axially hold these electrodes.

In addition, as an apparatus for causing the coating material electrode to vibrate, a vibrating apparatus comprising an electromagnet which is vibrated by a commercial AC power or a high frequency pulse power supply, springs, etc., or a vibrating apparatus comprising an eccentric cam having an eccentric rotary shaft and a motor to rotate it, and the like are used. The discharge coating apparatus is conventionally constituted in such a manner that these apparatuses allow the chuck, to which the above-mentioned wire- or rod-shaped coating material electrode was attached, to vibrate, and that the point of the electrode comes into contact with the surface of the workpiece and separates therefrom due to the above-mentioned vibrational motion.

On the other hand, a desired voltage pulse is applied when the coating material electrode comes close to or enters into contact with the workpiece surface.

The voltage pulse may have the same frequency as the vibrating frequency of the coating material electrode, but it may be a voltage pulse train having a higher repeating frequency which is intermittent in synchronism with the above vibration. In this case, a plurality of pulse discharges are produced during a certain period of time including one contact period.

Each discharge pulse heats the contact or approaching portion of the workpiece and coating material electrode, causing a portion of the coating material electrode (having particularly small heat capacity) to be melted, so that when the coating material electrode is removed from the surface of the workpiece, melt-adhered coating materials each having a diameter of about 10–30 μm are in the trace of the contact melting point.

In this way the coating material is fused and adheres to the workpiece surface due to the action of gravity and adhesion, whereafter the coating material electrode is removed and the fused metal is resolidified, thereby forming the melt-adhered portion of coating material.

However, the surface of its melt-adhered portion becomes notched because when the coating material electrode is removed from its surface, the fused metal is pulled and stretches as if a thread were pulled due to the surface tention.

It will be possible to carry out desired coatings on the entire or selected portions of the surface of the workpiece by providing a relative machining feed motion to the workpiece surface and/or coating material electrode in a perpendicular direction to the direction of the vibration, and the discharge point is moved on the workpiece surface so as to cover all of the desired portions.

However, in a conventionally known discharge coating apparatus, the coating material electrode is simply and confrontingly disposed on the workpiece surface and this is vibrated perpendicularly against the surface to be coated. Therefore, there are many problems, for example, when the coating material electrode is removed from the surface, the fused coating material is pulled and stretched perpendicularly to the surface as if a thread were pulled and then is finally cut, so that a large projection is produced on the coating surface; on the other hand once such a projecting portion is formed, the contact and melt-adhering of the coating material electrode barely occurs around its projection; as a result of this, the coating material is not uniformly adhered, causing the surface of the coating layer to become notched; moreover, a number of fairly large pin holes and flaw portions are produced; in addition, since the maximum amount that can be coated is small, a thicker coating layer cannot be obtained and the density of the coating layer is insufficient.

In the specification of the U.S. Pat. No. 4,346,281, a plurality of wire-shaped electrodes are annularly held so as to be mutually parallel and the point portions of the wire-shaped electrodes come into substantially parallel contact with the workpiece surface, and a voltage pulse is supplied between the electrodes and the workpiece while rotating the electrodes around the central axis of the assembly of electrodes, thereby forming a coating layer on the workpiece surface.

With this apparatus, the points of the coating material electrodes are rotated along a circular locus which is substantially perpendicular to the workpiece surface, thereby to form a coating layer. However, although this method can provide efficient formation of the coating layer, enough stable mechanical contact is not realized between the coating material electrodes and the workpiece surface, so that a coating layer with sufficiently good quality is not obtained.

Also, in the specification of the U.S. Pat. No. 3,741,426, a rotating electrode is also disclosed, and a voltage pulse train is supplied between the electrode and the workiece while rotating the electrode around the central axis thereof, which is kept parallel to the surface of the workpiece, thereby forming a coating layer on the workpiece surface.

And also, in the specification of Japanese Patent No. 931,227, it is set forth that a rotating electrode is held perpendicular to the surface of the workpiece, and a voltage pulse train is supplied between the electrode and the workpiece while rotating the electrode around the central axis thereof, thereby forming a coating layer on the workpiece surface.

However, in spite of these improvements, a coating layer with sufficiently good quality is not obtained.

SUMMARY OF THE INVENTION

The present invention seeks to obviate the deficiencies in the prior art and it is an object of the invention to provide a novel method and apparatus for discharge coating by which a thick, uniform and dense coating layer with a smooth surface can be formed over the entire desired area.

The above object is accomplished by vibrating the coating material electrode in its longitudinal direction and further applying another additional motion to the electrode for moving the electrode along a path which is not perpendicular to but has a proper slant angle with the workpiece surface, thereby slowly coming into contact with and moving away from the workpiece surface.

In a preferred embodiment, the motion path which slants from the workpiece surface is established by holding the shaft of the coating material electrode perpendicular to the workpiece surface and vibrating the electrode in its longitudinal direction in a conventionally known manner, and then adding a rotational motion around the above-mentioned shaft.

The point of the coating material electrode is removed from the workpiece surface at the composite speed of the axial departure velocity due to its axial vibration and the tangential velocity due to its rotational motion; therefore, the fused portion is adhered as if it were coated on the surface of the coating layer, so that burrs or projections which are perpendicular to the coating layer surface are not formed.

Since the tangential velocity component at the peripheral edge portion of the coating material electrode is large, the departure direction of the coating material is advantageously nearly parallel to the workpiece surface; however since the tangential velocity component near the rotary central axis is small, the departure direction is adversely nearly perpendicular to the workpiece surface, so that an adequate effect of the present invention is not obtained. To prevent such undesirable effect, it is preferable to use, as a coating material electrode, an electrode in which a long central hole is formed, or an electrode which is shaped like a cup, or a plurality of thin wire-shaped electrodes which are arranged such that their cross sections are annularly and continuously connected in one plane, or the like.

Furthermore, in the present invention, the above-described operations can be performed not only in the ambient air but also in a vacuum or an inert gas such as argon, or a reducing gas such as hydrogen, or a mixture of these.

The present invention will be described in detail hereinbelow with reference to the accompanying drawings.

BRIEF DESCRIPTION OF THE DRAWINGS

FIGS. 1 and 2 are explanatory views showing the relative motion of the electrode and workpiece surface and the state in which a coating layer is formed by a known discharge coating method;

FIG. 3 is an explanatory view showing the relative motion of the electrode and workpiece surface and the state in which a coating layer is formed by a method and an apparatus according to the present invention;

FIGS. 12 to 18 are diagrams showing the waveforms of the main pulses which are used for the apparatus of the present invention;

DETAILED DESCRIPTION OF THE PREFERRED EMBODIMENTS

Figure 4:
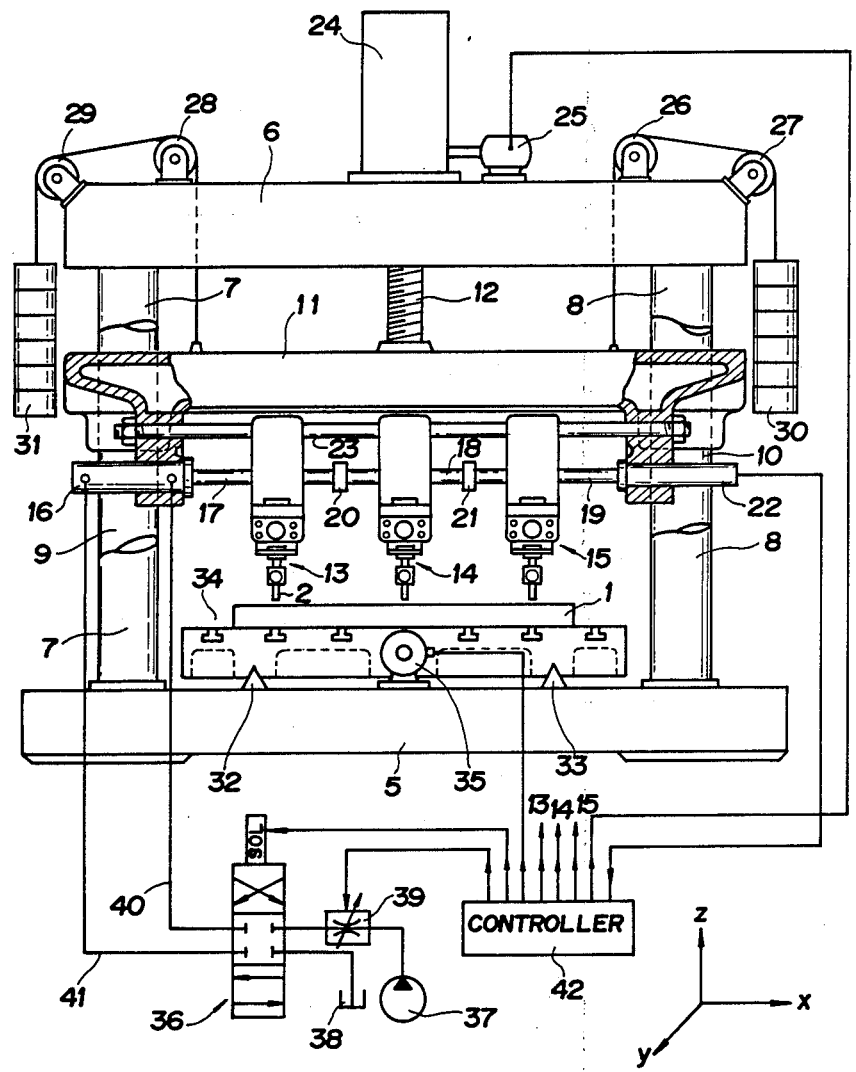
FIG. 4 is a front view showing the overall construction of the discharge coating apparatus according to the present invention.

In FIGS. 1 to 3, reference numeral 1 denotes a workpiece; 2 is a simple rod-like coating material electrode; and 3 is a metal fused due to the electric discharge caused between the coating material electrode 2 and the workpiece 1 when the point of the electrode 2 comes into contact with the surface of the workpiece 1. However, the fused metal 3 is illustrated as an extremely magnified part.

As will be illustrated in detail later, a vibrational motion is applied to the coating material electrode 2 in its axial direction such that its point successively comes into contact with and is removed from the surface of the workpiece 1. At the same time, a direct current or high frequency pulse train is supplied between the electrode and the workpiece synchronously with its vibration, during a certain period including the time that the point of the coating material electrode is in contact with the workpiece surface. Hence, the metal is fused or softened at the contact point between the electrode and workpiece.

Generally, the coating material electrode 2 has a smaller heat capacity than that of the workpiece 1 and assumes a higher temperature, so that the fused amount of the electrode is larger than that of the workpiece. Therefore, with the aid of gravity as well as its amount, the fused substance of the coating material is adhered on the surface of the workpiece 1, thereby to form a coating layer.

Although this fused metal is, initially, an alloy of the alloy constituting the workpiece 1 and the coating material, it will finally become the fused substance consisting substantially only of the coating material because the component of the coating material gradually increases.

In a known apparatus, even if the scanning feed is affected in a plane which is perpendicular to the vibrating direction between the workpiece 1 and the coating material electrode 2, the feed speed is so slow that the relative motion between both will be the vibrating motion which is substantially perpendicular to the workpiece surface.

Consequently, this fused metal 3 is pulled and stretched like a thread as if a viscous liquid were scooped up and the thread is rapidly cooled and is finally cut, so that as shown in FIG. 2, conically pointed or crater shaped resolidified portions 3a and 3b are formed in the traces of the above-mentioned contact points.

It will be understood that the shape of this resolidified portion 3a is not ideal for the coating layer.

This resolidified portion 3a itself is a disadvantageous projecting portion; moreover, when the coating material electrode 2 again drops, the resolidified portion 3a will collide with the resolidified portion 3b, so that there is a great possibility of growth since it will be again fused. If such a situation occurs, the contiguity or contact, and discharge between the workpiece 1 and the coating material electrode 2 and fusion thereof will be difficult at its peripheral portion; as a result of this, the surface of the coating layer cannot be smooth, and further defects such as cavities, or the like will occur in the coating layer.

In addition, the resolidified portion 3b produced at the point of the coating material electrode 2 may strike and break and damage the coating layer produced on the workpiece 1 when it hits the surface of the workpiece 1.

In the present invention, as shown in FIG. 3, in addition to the vibration perpendicular to the surface to be coated, an additional motion which is parallel to the surface is applied to the coating material electrode 2; therefore, the coating material electrode 2 relatively moves along a wave-like curve 4 similar to a sine curve which falls between two levels shown in the drawing, i.e. a higher level H and a lower level L.

FIG. 3 shows the state in which the coating material electrode 2 is removed from the coating layer, namely the situation when it parts from the lowest level. At this time, since the coating material electrode 2 has both vertical velocity $V_y$ in the direction perpendicular to the coating surface and sliding velocity $V_y$ in the direction parallel to that surface, the fused metal is coated on the surface of the workpiece 1. Therefore, resolidified portions 3c thus formed are piled up like fish scales, thereby forming a dense and rigid coating layer.

From FIG. 3, the situation can be easily assumed wherein the coating material electrode 2 drops down and touches down the coating layer. During the landing operation at this time, the projecting portion such as the resolidified portions 3a and 3b shown in FIG. 2 already described previously, even if they are possibly present, will be immediately fused and coated near them, so that they will disappear.

In a desired embodiment, during the period of time when the coating material electrode 2 is at the lower level and is in contact with the surface of the workpiece 1, both are rubbed over a fairly long distance and a direct current or high frequency voltage pulse train is applied thereto all during that period.

In a further preferred embodiment, the coating material electrode 2 is supported by means of an elastic member which can grip it in the direction of the above-mentioned additional motion; thus, the skipping motion of the coating material electrode 2 is forcibly effected on the surface of the workpiece 1, i.e. the repetitive motion consisting of the sudden stop and sliding motion is enforced. A sufficient amount of metal is fused during the period when the electrode stops, whereas the rapid sliding motion acts to distributed the fused metal over a wide range on the workpiece surface.

In particular, when the coating material electrode 2 is raised from the lowest level L, the electrode 2 is released from the frictional force between the electrode 2 and the surface of the workpiece 1, so that a large sliding velocity is suddenly applied due to the energy accumulated in the above-mentioned elastic member, thereby finishing the surface smoothly.

The discharge coating apparatus schematically illustrated in FIG. 4 will now be described hereinbelow.

In the drawing, reference numeral 5 indicates a base; 6 is a top beam; 7, 8, 9, and 10 columns, 11 a cross beam which is elevationally supported by the columns 7, 8, 9, and 10; 12 an elevating screw for the cross beam 11; 13, 14 and 15 travelling heads; 16 a hydraulic feeding cylinder; 17, 18 and 19 feed rods; 20 and 21 shaft joints; 22 and encoder; 23 a guide rod; 24 a cross beam elevating mechanism; 25 a motor; 26, 27, 28, and 29 pulleys; 30 and 31 counterbalances; 32 and 33 guideways; 34 a table which is slidably mounted on the guideways 32 and 33 and on which the workpiece 1 is mounted and fixed; 35 a feed motor to move the table 34; 36 a 4-way hydraulic feed control valve; 37 an oil pump; 38 an oil tank; 39 a flow control valve; 40 and 41 hydraulic pipings; and 42 a controller.

The four columns 7, 8, 9, and 10 mounted on the base 5 support on their top portions the top beam 6, and slidably support and guide the cross beam 11 at their intermediate portions.

The cross beam 11 is elevated along the columns 7, 8, 9, and 10, i.e. in the direction of the z axis, namely, vertically in FIG. 4, by the cross beam elevating screw 12 to be elevated by the cross beam elevating mechanism 24 provided on the top beam 6. At that time, the load of the cross beam elevating mechanism 24 due to the weight of the cross beam 11 is reduced by the counterbalances 30 and 31.

The travelling heads 13, 14 and 15 are slidably supported along the guide rod 23, i.e. in the direction of the x axis, namely, horizontally in FIG. 4, and are reciprocally moved in the above-mentioned directions by the feed rods 17, 18 and 19 which are driven by the hydraulic cylidner 16.

The travelling heads 13, 14 and 15 will be described in detail later with reference to FIG. 5.

The table 34 is slidably mounted on the pair of guideways 32 and 33 each having a triangular cross section which are attached in parallel on the base 5, and is reciprocally and horizontally moved, i.e. in the direction of the y axis shown in the drawing through a feed screw (not shown) by the motor 35.

The workpiece 1 is attached on the table 34 in a well-known manner, for example, by T bolts and the like (not shown).

When the coating material electrodes 2 attached to the bottom portions of the travelling heads 13, 14 and 15 are vertically vibrated through the cross beam elevating mechanism 24 by the motor 25 controlled by the controller 42, the cross beam 11 can intermittently contact the upper surface of the workpiece 1 at its lower ends.

The cross beam 11 is positioned at a suitable height such that a desired electric discharge occurs to form a coating layer. In such a state, the hydraulic cylinder 16 allows the feed rods 17, 18 and 19 to be displaced at a proper speed, thereby causing the point of the coating material electrode 2 to move on the surface of the workpiece 1.

The travelling speeds and locations of the travelling heads 13, 14 and 15 are detected by the encoder 22, and the detection signals are supplied to control the opening angle of the flow control valve 39 to hold the travelling speeds of the travelling heads 13, 14 and 15 to desired values, and they also controls the solenoid of the 4-way hydraulic feed control valve 36 to reciprocally move these travelling heads so as to cover desired regions. At the same time, on the other hand, the controller 42 feeds the workpiece 1 in the direction perpendicular to the moving direction of the above travelling heads through the table 34.

Due to this, the desired regions on the surface of the workpiece 1, either the entire or a part of the surface thereof are completely transversed by the bottom portion of the coating material electrodes 2. At the same time, as will be described later with respect to FIG. 5, the discharge is performed between the coating material electrodes 2 and workpiece 1, thereby forming coating layer having a desired thickness which covers the above-mentioned desired region.

For this purpose, it is preferable to use a numerical controller as the controller 42.

Next, FIG. 5 will be described.

Figure 5:
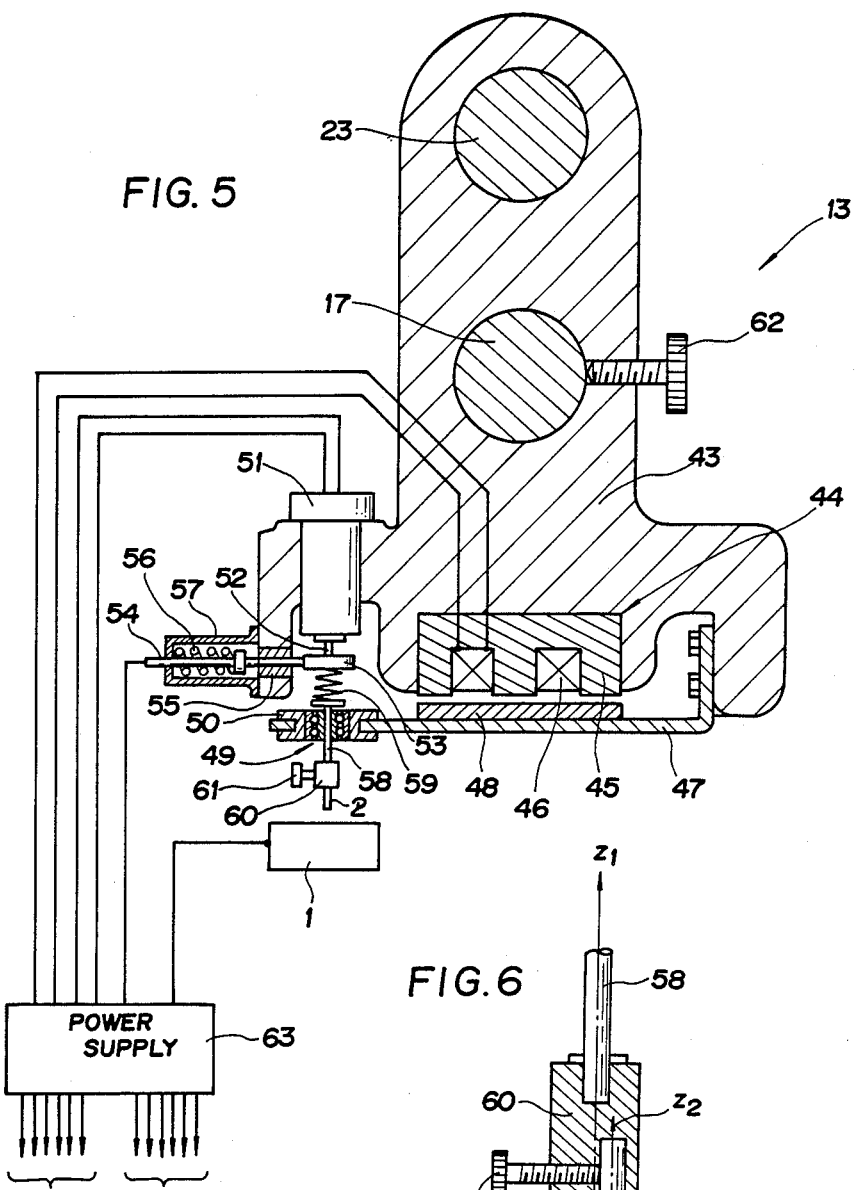
FIG. 5 is an enlarged cross sectional view of the main part of the apparatus shown in FIG. 4.

The constructions of the other travelling heads 14 and 15 are identical to that shown in FIG. 5, and only the construction of the travelling head 13 is illustrated and described herein.

In the drawing, reference numeral 43 represents a carriage; 44 is an electromagnet consisting of an iron core 45 and a coil 46; 47 an L-shaped curved leaf spring; 48 an attracted member made of high permeability material such as soft iron or the like; 49 a ball bearing; 50 a holding member; 51 a motor; 52 an output shaft of the motor 51; 53 a current collecting disk; 54 a current supplying rod; 55 an insulating, bushing; 56 a coil spring for the current supplying rod 54; 57 a housing for the current supplying rod; 58 a rotary shaft; 59 a coil spring to form a skipping apparatus; 60 a chuck, provided at the end of the rotary shaft 58, for engaging the coating material electrode 2; 61 a set screw to fix the coating material electrode 2; 62 a set screw to fix the carriage 43 to the rod 17; and 63 a power supply.

The controller 42 shown in FIG. 4 controls the respective power supplies such that the travelling heads 13, 14 and 15 operate with a phase difference of 120° from each other.

The power supply 63 shown in FIG. 5 supplies current to the travelling heads 14 and 15 as well as the travelling head 13; its details will be described later with respect to FIG. 19.

A pulse current having a certain pulse repetition frequency, for example of about 300 Hz, is generally supplied to the coil 46, thereby periodically attracting the member 48 attached to the leaf spring 47, so that the leaf spring 47 is vibrated.

Electric power for discharge coating is supplied between the coating material electrode 2 and the workpiece 1 through the current supplying rod 54, current collecting disk 53, coil spring 59, rotary shaft 58, and chuck 60.

In the case where a rod material having a square cross section whose one side is about 5 mm, or a circular rod material having a diameter of about 5–6 mm is used as the coating material electrode 2, it is preferable that the rotating speed of the output shaft 52 of the motor 51 is set at about 1000 rpm, and the voltage pulse to be fed between the coating material electrode 2 and the workpiece 1 is set such that the peak value becomes about 50 V in the no-load state, i.e. in the state wherein both are spaced apart and no discharge occurs, and that a current of about 70 A at the peak value flows when both come into contact.

It is desirable that the pulse width Ton of this voltage pulse be set at about 60–2000 $\mu$Sec and the pulse separation Toff be set at about 20–60 $\mu$Sec.

Figure 6:
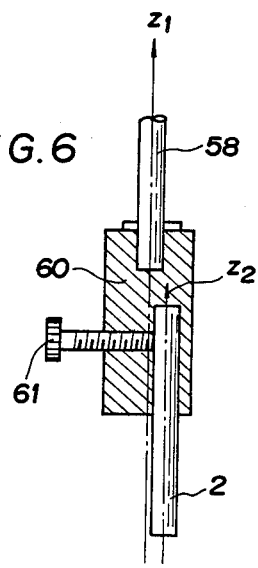
FIG. 6 is an enlarged cross sectional view showing a preferred construction of a holding apparatus of a coating material electrode.

When attaching the circular or square rod-like coating material electrode 2 to the chuck 60, as shown in FIG. 6, it is preferable to attach it in such a manner that its central axis $z_2$ is offset from the central axis $z_1$ of the rotary shaft 58 by approximately the maximum radius of the coating material electrode 2.

The reason for this is that sufficient sliding velocity cannot be obtained if the electrode 2 is attached to the central axis $z_1$ of the rotary shaft 58.

However, if one tries to rotate the coating material electrode 2 at high speed in the state shown in FIG. 6, various problems will be produced.

That is to say, the edge of the coating material electrode 2 may cut and scrape the coating layer, and the rotary shaft 58 and other rotational portions and the bearings may be unbalanced due to the torque of the frictional and centrifugal forces; this results in distortion in each portion due to the vibration and concentration of stress.

These problems can be overcome by adopting coating material electrodes having the shapes as shown in FIGS. 7 to 11, and rotating them around the axis of their center holes.

Figure 9:
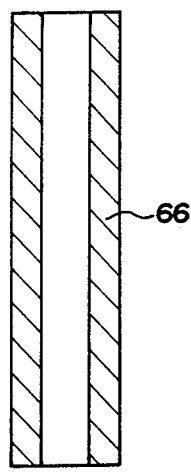
FIG. 9 is a transverse cross sectional view showing another preferred shape of the coating material electrode.
Figure 7:
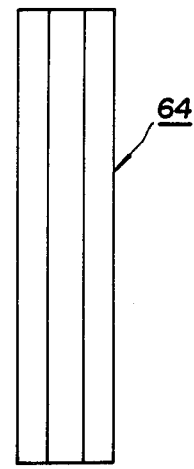
FIG. 7 is a side elevational view showing one preferred shape of the coating material electrode.
Figure 10:
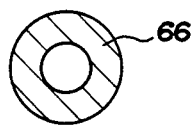
FIG. 10 is a longitudinal cross sectional view of the coating material electrode shown in FIG. 9.
Figure 8:
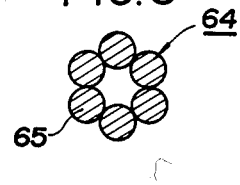
FIG. 8 is a transverse cross sectional view of the coating material electrode shown in FIG. 7.

A coating material electrode 64 shown in FIGS. 7 and 8 is a long hollow body consisting of six thin rods whereas in FIGS. 9 and 10 the electrode is a thick tubular coating material electrode 66.

Figure 11:
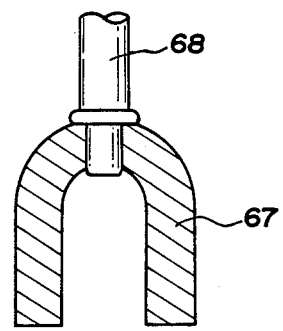
FIG. 11 is a longitudinal cross sectional view showing still another preferred shape of the coating material electrode.

FIG. 11 shows a coating material electrode wherein a shaft member 68 is attached to a bowl-shaped or oriental bell-shaped coating material 67.

Since these coating material electrodes can be adopted using their geometrical and dynamic symmetry axes as rotational central axes, even if they are rotated at high speed while pressing them against the workpiece 1, no vibration will occur and the coating layer will not be scratched during the rotation.

For these coating material electrodes, since no coating material exists in the rotational central portion, sufficient sliding velocity can be provided even at the portions of the contact surface with the workpiece 1.

The effect of this central hole is shown in FIGS. 21 to 24.

Figure 21:
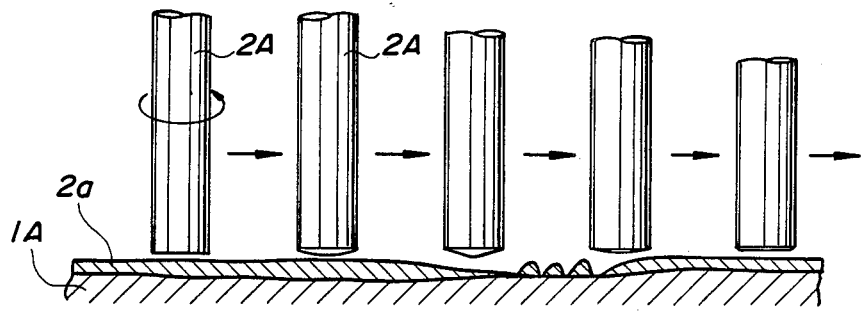
FIG. 21 is a side elevational view with a part cut away showing the change of the point shape of an electrode and the cross sectional shape of a coating layer when a solid columnar electrode is used.

In FIG. 21, a solid columnar electrode 2A moves from the left to right in the drawing while rotating around its central axis, thereby forming a discharge coating layer 2a on a base metal 1A.

Figure 22:
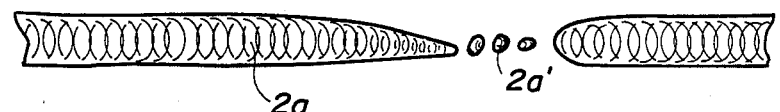
FIG. 22 is a top plan view of the coating layer shown in FIG. 21.

In this case, in the portion outside the rotational central portion of the electrode 2A, the electrode material is smoothly fused and is adhered on the surface of the base metal 1A, so that the electrode 2A will be gradually consumed. However, on the central axis, since an insulating covering is produced on the electrode surface, fusion due to discharge is not caused, so that the point of the electrode will become conical. When this conical point grows, the formation of the coating layer is obstructed and the adhering width gradually become thin as shown in FIG. 22, and finally the adhesion will be interrupted. In such a case, the insulating layer at the point portion of the coating material electrode 2A is destroyed due to the frictional force and discharge occurs. Thus, the point portion becomes a spot or lump 2a' and is melt-adhered on the surface of the base metal 1A and the electrode point again becomes flat. However, since similar cycles are repeated, such interruption of the coating strip and the formation of defective-shaped melt-adhered portions separated like islands takes place periodically, so that defective portions of the coating layer are formed.

Thereafter, these defective portions are ground down by the electrode or are covered by the coating layers to be formed in the upper layers, but they will not be completely mended and remain on the coating surface, so that its uniformity will be lost.

These problems can be solved by forming a small hole in the rotational center of the electrode. An adequate effect will be obtained even if the diameter of this hole is relatively small, e.g. about 1 mm or less. Therefore, its diameter may be properly determined from the viewpoint of the hole forming technology and from the viewpoint of effective usage of electrode materials. Typically, a hole diameter in the range of about 1 to 5 mm is recommended.

Figure 23:
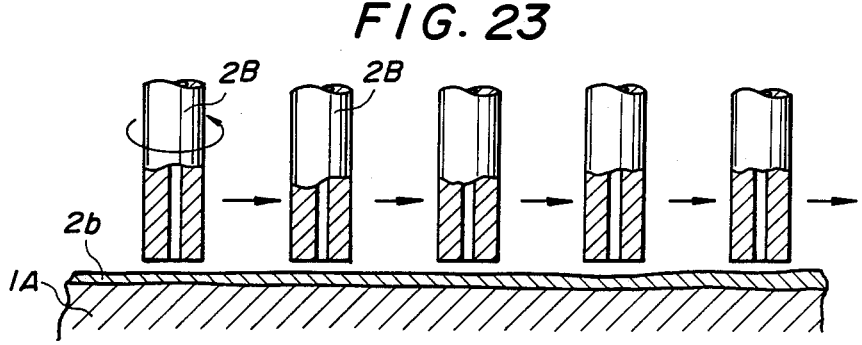
FIG. 23 is a side elevational view with a part cut away showing the change of the point shape of an electrode and the cross sectional shape of a coating layer when an electrode having a central hole is used.
Figure 24:
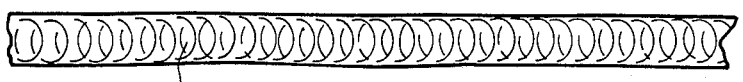
FIG. 24 is a top plan view of the coating layer shown in FIG. 23.

When an electrode 2B having a hole in the rotational center in this way is used, as shown in FIG. 23, the point surface of the electrode is uniformly consumed, so that a uniform coating layer 2b without the defective portions as described above is formed.

The electrical operation of the apparatus will now be described with reference to FIGS. 12 to 19.

Figure 19:
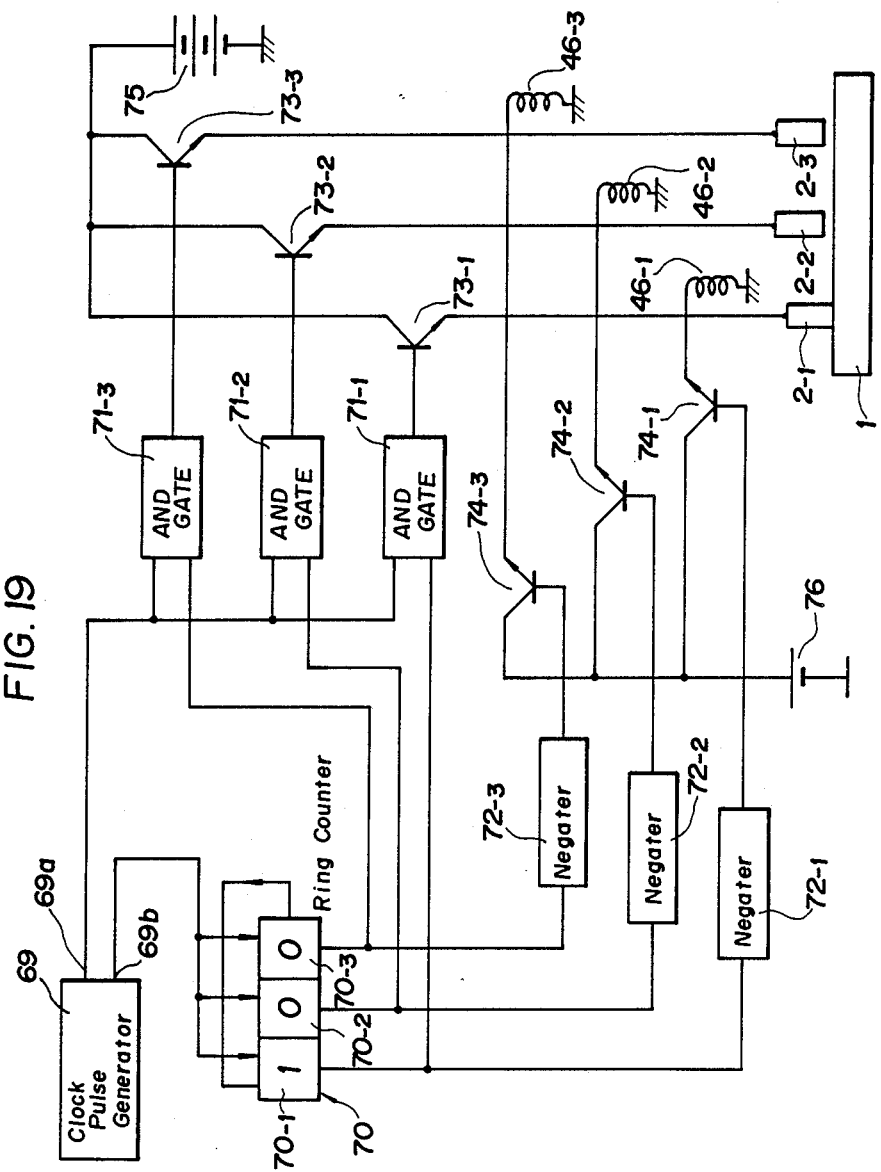
FIG. 19 is a circuit diagram showing a circuit for generating the above pulses.

In FIG. 19, reference numerals 2-1, 2-2 and 2-3 indicate coating material electrodes attached to the travelling heads 13, 14 and 15, respectively; 46-1, 46-2 and 46-3 are electromagnet coils for the travelling heads 13, 14 and 15; 69 a clock pulse generator; 70 a ring counter; 71-1, 71-2 and 71-3 AND-gates; 72-1, 72-2 and 72-3 negaters; 73-1, 73-2 and 73-3 switching elements for discharge coating current pulses; 74-1, 74-2 and 74-3 switching elements for current pulses for exciting of the electromagnet coils 46-1, 46-2 and 46-3; 75 a DC power supply for discharge coating; and 76 a DC power supply for exciting the electromagnets.

The clock pulse generator 69 has two output terminals 69a and 69b. A clock pulse train having a certain pulse repetition frequency, nfor example, of 2380.95 Hz is supplied at the output terminal 69a, and the clock pulse train having the pulse repetition frequency of 297.62 Hz, ⅛ of the former frequency, is supplied at the output terminal 69b.

The former pulse is a pulse train $P_a$ shown in FIG. 15. This a pulse train $P_a$ has a pulse width of 400 μSec and pulse separation of 20 μSec, and its pulse duly factor is extremely high. On the contrary, the latter low frequency clock pulse can be an ordinary clock pulse.

The ring counter 70 consists of three bits 70-1, 70-2 and 70-3; only one bit among them is always in state 1 and the other two bits are in state 0. In the state shown in the drawing, the bit 70-1 is in state 1 and the other two bits 70-2 and 70-3 are in state 0. However, the position of the bit which is in state 1 is shifted when a shift command pulse is applied.

The low frequency pulse output from the terminal 69b is sent to the ring counter 70 as a shift pulse for allowing the bit position of state 1 to be shifted.

The output pulses from the ouput terminals provided for each bit to indicate the state of each of the bits 70-1, 70-2 and 70-3 of the ring counter 70 are pulses $P_1$, $P_2$ and $P_3$ shown in FIGS. 12, 13 and 14, respectively. Each of these pulse trains has a duty factor of ⅓ and the phase difference between them is 120°.

These output pulses are sent through the AND gates 71-1, 71-2 and 71-3 to each base of the switching elements 73-1, 73-2 and 73-3, while also, they are sent to the negaters 72-1, 72-2 and 72-3, where they are inverted, and thereafter they are sent to each base of the switching elements 74-1, 74-2 and 74-3.

In the state shown in FIG. 19, since the bit 70-1 is in state 1, the switching element 74-1 is off and the switching elements 74-2 and 74-3 are on. Thus, the electromagnet 44 of the travelling head 13 is not excited and the attracted member 48 is not attracted to the iron core 45, so that the point of the coating material electrode 2-1 is in the state in which it can come close to or into contact with the surface of the workpiece 1. However, the electromagnets of the other travelling heads 14 and 15 are excited and, accordingly, attract the respective corresponding attracted members, so that the coating material electrodes 2-2 and 2-3 are removed from the workpiece 1, or are being removed therefrom.

On the other hand, the high frequency clock pulse $P_a$ generated from the clock pulse generator 69 passes through the AND gate 71-1 and can reach the base of the switching element 73-1. Hence, the switching element 73-1 is switched in synchronism with the clock pulse $P_a$, so that the current pulses as shown in FIG. 16 are supplied across the workpiece 1 and coating material electrode 2-1.

When one clock pulse is supplied from the output terminal 69b of the clock pulse generator 69, the bit 70-2 assumes state 1 and the bit 70-1 assumes state 0, so that the switching element 74-1 becomes on and the switching element 74-2 becomes off. As a consequence, the coating material electrode 2-1 is removed from the workpiece 1 and the electrode 2-2 comes close to or into contact with the workpiece 1. At the same time, on the one hand, the negater 72-2 is opened by the clock pulse $P_a$ and the switching element 73-2 serves to supply the electric power to the coating material electrode 2-2. This current pulse is shown as I in FIG. 17.

The next clock pulse causes the coating material electrode 2-2 to be removed from the workpiece 1, and in place of this, it allows the electrode 2-3 to come into contact with the workpiece 1. At the same time, the current pulse I shown in FIG. 18 is supplied to both through the AND gate 71-3 and switching element 73-3.

However, since the AND gates 71-1 and 71-3 are closed, the switching elements 73-1 and 73-3 are off, so that no current pulse is distributed to the coating material electrodes 2-1 and 2-3.

During the above-described cycles, each of the coating material electrodes 2-1, 2-2 and 2-3 is rotated around the respective axis at the speed of 1000 rpm, thereby forming a coating layer with excellent quality on the surface of the workpiece 1.

Figure 20:
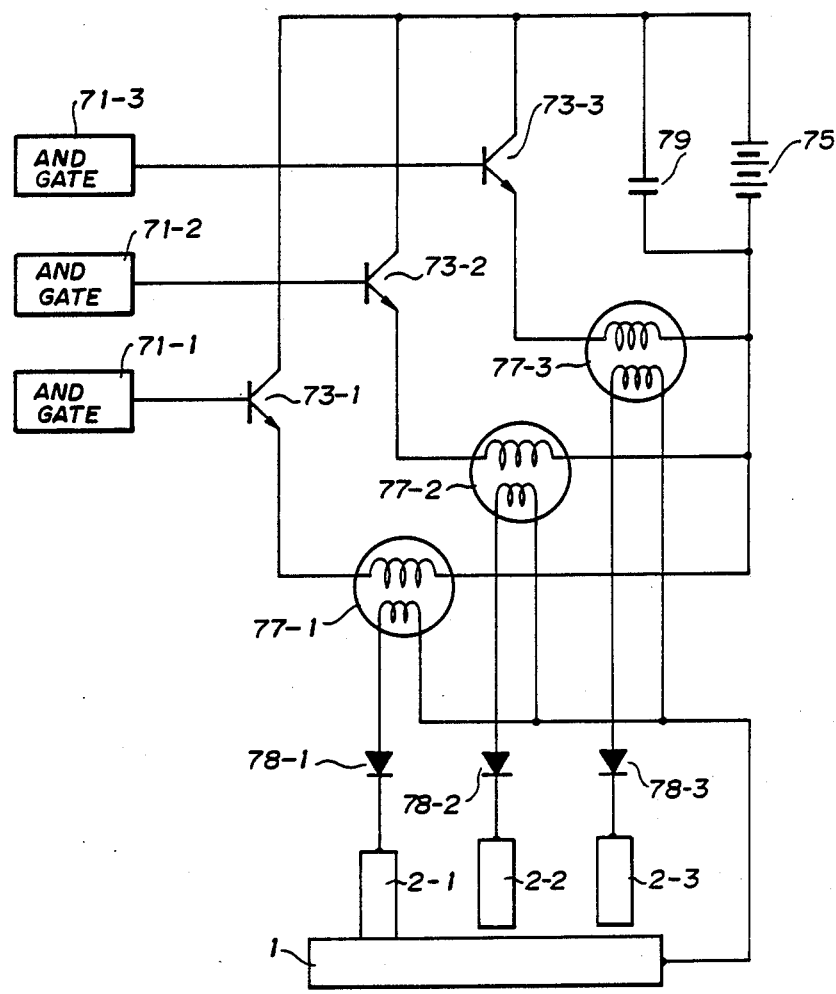
FIG. 20 is a partial circuit diagram showing a modification of the output section of the circuit shown in FIG. 19.

In this circuit, the section to supply the electric power, for coating, to the coating material electrode and workpiece can be modified as shown in FIG. 20.

In the drawing, numerals 77-1, 77-2 and 77-3 represent inductive couplings, i.e. pulse transformers; 78-1, 78-2 and 78-3 are diodes; and 79 is a capacitor to smooth current.

With this circuit, it is possible to simplify the protection circuit (not shown) of the switching elements 73-1, 73-2 and 73-3; therefore, there is the advantage that the whole apparatus can be miniaturized.

Figure 25:
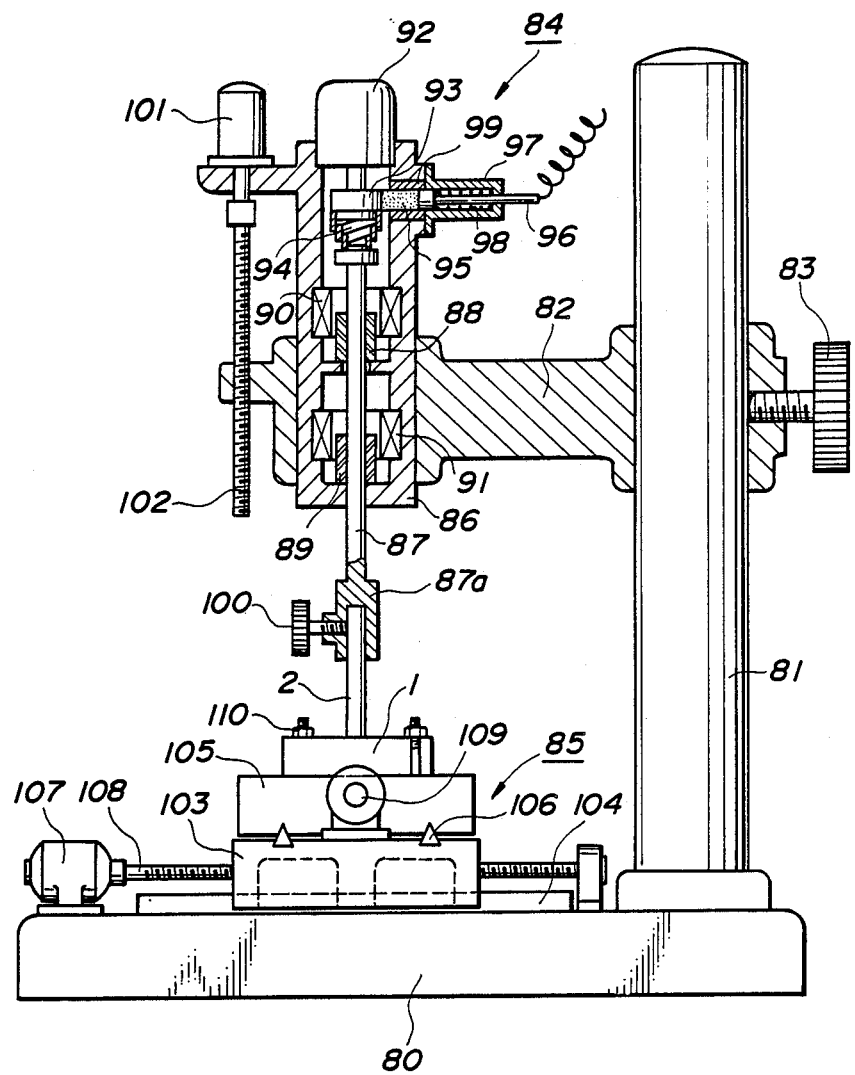
FIG. 25 is a side elevational view with a part cut away illustrating another embodiment of the discharge coating apparatus according to the present invention.

Next, FIG. 25 will be described.

In the drawing, reference numeral 80 denotes a bed; 81 a column upstanding on the bed 80; 82 an arm supported by the column 81; 83 a screw for fixing the arm; 84 a head elevationally supported by the arm 82; 85 a cross table which is mounted on the bed 80 and to which the workpiece 1 is attached. The head 84 comprises: a housing 86; a vibrating stem 87 which has at its lower end an electrode chuck portion 87a and is supported by the housing 86 to freely rotate and vibrate in its axial direction; iron cores 88 and 89 respectively fixedly attached to two portions in the intermediate portion of the vibrating stem 87; vibration generating coils 90 and 91; a motor 92 to rotate the vibrating stem 87; a current receiving disk 93 attached to the output shaft of the motor 92; a volute spring 94 for coupling the current receiving disk 93 and the vibrating stem 87; a current supplying shoe 95 for supplying current to the current receiving disk 93 by coming into contact with the side surface thereof; a current supplying rod 96; a current supplying section housing 97 made of plastic; a spring 98; an insulating bushing 99; and an electrode attaching screw 100. The head 84 is elevated along the column 81 by a head elevating motor 101 and an elevating screw 102. The cross table 85 is constituted by a travelling table 103 in the X axial direction which is movably mounted on a guide rail 104 provided on the bed 80, a travelling table 105 in the Y axial direction which is movably mounted on a guide rail 106 provided on the travelling table 103 in the X axial direction, a travelling motor 107 to effect drive in the X axial direction, a travelling screw 108 in the X axial direction, a travelling motor 109 to effect drive in the Y axial direction, and a travelling screw in the Y axial direction (not shown), etc.. Numeral 110 is a clamp for attaching the workpiece 1 to the cross table 85.

In this apparatus, although the vibrating stem 87 is urged downwardly due to the elastic force of the volute spring 94 and the weight thereof, when a voltage pulse is supplied from a power supply (not shown) to the vibration generating coils 90 and 91, their electromagnetic forces periodically act to attract and pull up the iron cores 88 and 89, so that they are strongly vertically vibrated. Therefore, the point of the electrode 2 attached to the lower end portion of the vibrating stem 87 comes into contact with and is removed from the upper surface of the workpiece 1.

Electric power for coating is supplied to the electrode 2 through the current supplying rod 96, current supplying shoe 95, current receiving disk 93, volute spring 94, and vibrating stem 87. The workpiece 1 is displaced by means of the cross table 85 driven by the motors 107 and 109 in the two directions of the X and Y axes perpendicularly to the central axis of the electrode 2, thereby forming a coating layer on a desired surface of the workpiece 1.

The effects of the present invention will be described hereinbelow with respect to the examples in comparison with the prior art.

EXAMPLES OF MACHINING BY A PRIOR-ART METHOD

Typically, the following machining conditions are considered to be optimum to perform the discharge coating by a prior art method; i.e. wherein only vibration in the axial direction and the machining feed at extremely low speed in the direction perpendicular to the aforesaid axial direction are applied to the coating material electrode, but the "additional motion" and "sliding velocity V" according to this invention are not applied to the electrode.

| Power voltage (no load): | 50 V |
|---|---|
| Voltage current pulse: | |
| Pulse width ($T_{on}$): | 80 μsec |
| Pulse separation ($T_{off}$): | 20 μsec |
| Discharge current pulse amplitude: | 70 A |
| Vibration frequency of the electrode: | 300 Hz |
| Scanning velocity of the electrode: | 10 mm/min |

The coating material electrode is mounted perpendicularly to the surface to be coated and is vibrated in its axial direction under the above-mentioned conditions, thereby permitting its point successively to come into contact with and be removed from that surface.

It is recommended that the electrode and workpiece surface be kept together in contact during a time period of 1/10 to ⅓ of one vibration cycle, and that three to ten pulses are supplied during that period thereby to perform the discharge.

For example, in the case where the coating layer is formed on the surface of a member consisting of SKH9 hardened steel in air using a sintered alloy cylindrical rod having a circular cross section whose diameter is 5 mm, as a coating material, consisting of 10 weight percent of cobalt and the remainder of tungsten carbide, a coating layer having an average thickness of about 4.8 to 5.2 μm was formed at a speed of 3.6 to 4 mg/min under the above-described conditions.

This coating amount is substantially the maximum limit and it is essentially impossible to perform any greater laminate coating.

It has been found by observing the cross sectional view of this coating layer that the surface of the base metal is largely of wave form since it was struck by the coating material electrode and the coating layer is porous, and that there are various mixed portions such as one portion where the coating layer is localized and becomes thick like a small hill, another portion like the bottom of a ravine where there is little coating material deposited between those small hills, a further portion where thin coating material is deposited although its thickness is relatively uniform, and the like. The Vickers hardness was 1200 Hv, but even if the particularly projecting portion is excluded, the roughness of the coated surface was about 95 to 80 μm Rmax. Especially, the projecting portion was weak and could be easily peeled off.

EXAMPLE I

The processing was performed while rotating the electrode around its central axis at a speed of 1000 rpm under the same conditions as above. As a result of this, it was possible to form a coating layer having an average thickness of about 20 μm at a speed of 6-7.2 mg/min.

In this case, the coating material electrode rotates about 20° during one cycle of the motion of the coating material electrode. Assuming that the time period when the electrode is into contact with the coating surface is ⅓ of one cycle, the motor output shaft rotates 6° 40' (six degrees and forty minutes) during that period. This value means that the coating material electrode rubs against the coating surface by about 0.3 mm near the outer edge portion every time the coating material electrode come into contact with the coating surface.

It could be seen that the surface of the base metal did not have a wave form as was observed in the machining by the conventional method, but was smooth and the coated layer was thick and its thickness was substantially uniform over the entire surface, and that the texture was dense and the surface roughness of the coated layer was 7-8 μm Rmax in average over a wide range on the surface and the Vickers hardness was 1200 Hv.

However, in this example, the defective portions accompanied with relatively large projecting portions occurred periodically in the scanning direction, for the above-mentioned reason.

EXAMPLE II

To solve such problems, as a coating material electrode, a hole having an inside diameter of 0.5 mm was formed in the center of the above electrode, then a comparison test was performed under the same conditions as above.

As a result, it was possible to form a coated layer having an average thickness of about 8 to 10μm without any defects as mentioned above at a speed of 7 to 8 mg/min.

The surface roughness was 3μm Rmax as a maximum and 5 μm Rmax as an average.

EXAMPLE III

In the case of performing the method of the present invention, it was considered that a large diameter of the electrode is preferable. According to the present invention, it was considered that it is possible to use a pulse having a larger pulse width than that of the conventional method.

To verify these assumptions, a pipe-shaped electrode having an outside diameter of 15 mm and an inside diameter of 2 mm was made of the same material as in the above examples, and comparison tests were carried out.

The material of the workpiece, vibration frequency, rotational speed and scanning speed of the electrode are identical to those in the former examples.

|  | Test No. | | |
|---|---|---|---|
|  | i | ii | iii |
| Voltage pulse width: | 500 μSec | 1000 | 2000 |
| Voltage pulse separation: | 20 μSec | 40 | 40 |
| Current amplitude: | 72 A | 72 | 72 |
| Coating speed: | 20 mg/min | 21-24 | 22 |
| Coating surface roughness: | 8 μm Rmax | 7-8 | 11 |
| Thickness of the coating: | 19 μm | 21 | 20 |

In the conventional method, if such a current pulse is used, the coating material electrode will be immediately become red hot and at the same time, the surface of the base metal will also change to true black, so that the discharge coating cannot be effected any further.

However, according to the present invention, there will be no problems and a coating layer can be efficiently formed.

The coating speed by the conventional method was 4 mg/min and the thickness of the coated layer thus obtained was about 5 μm. Therefore, it will be appreciated that the coating capability of the present invention is approximately four times or more than that of the conventional method in terms of the velocity and thickness.

In addition, it is also possible to treat a spherical surface as well as a flat surface under the same conditions as above. For example, it is possible to form the coated layer with substantially the same quality as a flat surface on a spherical surface having a radius of, e.g. about 80 mm.

EXAMPLE IV

| Test Condition: | | |
|---|---|---|
| Electrode: | | |
| Material: | 10% Co-WC | |
| External diameter: | 3 mm | |
| Scanning speed: | 10 mm/min | |
| Rotating speed: | 960 rpm | |
| Center hole diameter: | 0.5 mm | |
| Vibrating frequency: | 300 Hz | |
| Voltage pulse: | | |
| Width: | 200 μSec | |
| Separation: | 40 μSec | |
| Current amplitude: | 32 A | |
| Results: | | |
|  | Electrode | |
|  | Having center hole | Solid |
| Coating speed: | 3.8 mg/min | 2.8 |
| Thickness of layer: | 2.8 μm/min | 1.7 |
| Roughness of surface: | 9 μm Rmax | 9 |
| Comparative data (no vibration, rotation only): | | |
|  | Electrode | |
|  | Having center hole | Solid |
| Coating speed: | 3.2 mg/min | 2.2 |
| Thickness of layer: | 2.2 μm/min | 1.5 |
| Roughness of surface: | 9 μm Rmax | 9 |

EXAMPLE V

| Test Condition: | |
|---|---|
| Electrode: | |
| Material: | 10% Co-WC |
| External diameter: | 8 mm |
| Scanning speed: | 10 mm/min |
| Rotating speed: | 960 rpm |
| Center hole diameter: | 1 mm |
| Vibrating frequency: | 300 Hz |

-continued

Voltage pulse:
Width: 1000 μSec
Separation: 45 μSec
Current amplitude: 45 A

Results:

| | Electrode | |
| --- | --- | --- |
| | Having center hole | Solid |
| Coating speed: | 13 mg/min | 10.8 |
| Thickness of layer: | 8.7 μm/min | 7.2 |
| Roughness of surface: | 11 μm Rmax | 11 |

Comparative data (no vibration, rotation only):

| | Electrode | |
| --- | --- | --- |
| | Having center hole | Solid |
| Coating speed: | 9 mg/min | 5 |
| Thickness of layer: | 6 μm/min | 3.3 |
| Roughness of surface: | 11 μm Rmax | 12 |

EXAMPLE VI

Test Condition:

Electrode:
Material: 10% Co-WC
External diameter: 20 mm
Scanning speed: 10 mm/min
Rotating speed: 960 rpm
Center hole diameter: 1 mm
Vibrating frequency: 300 Hz
Voltage pulse:
Width: 2000 μSec
Separation: 45 μSec
Current amplitude: 45 A Results:

| | Electrode | |
| --- | --- | --- |
| | Having center hole | Solid |
| Coating speed: | 15.4 mg/min | |
| Thickness of layer: | 10.3 μm/min | |
| Roughness of surface: | 12 μm Rmax | |

Comparative data (no vibration, rotation only):

| | Electrode | |
| --- | --- | --- |
| | Having center hole | Solid |
| Coating speed: | 7.1 mg/min | |
| Thickness of layer: | 4.7 μm/min | |
| Roughness of surface: | 13 μm Rmax | |

EXAMPLE VII

Test Condition:

Electrode:
Material: 1% B—5% Ni—5% Fe—WC
External diameter: 3 mm
Scanning speed: 10 mm/min
Rotating speed: 960 rpm
Center hole diameter: 0.5 mm
Vibrating frequency: 300 Hz
Voltage pulse:
Width: 200 μSec
Separation: 40 μSec
Current amplitude: 32 A Results:

| | Electrode | |
| --- | --- | --- |
| | Having center hole | Solid |
| Coating speed: | 3.8 mg/min | 2.1 |
| Thickness of layer: | 2.5 μm/min | 1.4 |
| Roughness of surface: | 9 μm Rmax | 9 |

Comparative data (no vibration, rotation only):

| | Electrode | |
| --- | --- | --- |
| | Having center hole | Solid |
| Coating speed: | 3.2 mg/min | 2.0 |
| Thickness of layer: | 2.1 μm/min | 1.3 |
| Roughness of surface: | 9 μm Rmax | 9 |

EXAMPLE IIX

Test Condition:

Electrode:
Material: 1% B—5% Ni—5% Fe—WC
External diameter: 8 mm
Scanning speed: 10 mm/min
Rotating speed: 960 rpm
Center hole diameter: 1 mm
Vibrating frequency: 300 Hz
Voltage pulse:
Width: 1000 μSec
Separation: 40 μSec
Current amplitude: 45 A Results:

| | Electrode | |
| --- | --- | --- |
| | Having center hole | Solid |
| Coating speed: | 16 mg/min | 9.6 |
| Thickness of layer: | 10.7 μm/min | 6.4 |
| Roughness of surface: | 12 μm Rmax | 12 |

Comparative data (no vibration, rotation only):

| | Electrode | |
| --- | --- | --- |
| | Having center hole | Solid |
| Coating speed: | 8 mg/min | 5.7 |
| Thickness of layer: | 5.3 μm/min | 3.8 |
| Roughness of surface: | 13 μm Rmax | 12 |

EXAMPLE IX

Test Condition:

Electrode:
Material: 1% B—5% Ni—5% Fe—WC
External diameter: 20 mm
Scanning speed: 10 mm/min
Rotating speed: 960 rpm
Center hole diameter: 1 mm
Vibrating frequency: 300 Hz
Voltage pulse:
Width: 2000 μSec
Separation: 40 μSec
Current amplitude: 45 A Results:

| | Electrode | |
| --- | --- | --- |
| | Having center hole | Solid |
| Coating speed: | 15 mg/min | 7 |
| Thickness of layer: | 10 μm/min | 4.7 |
| Roughness of surface: | 12 μm Rmax | |

Comparative data (no vibration, rotation only):

| | Electrode | |
| --- | --- | --- |
| | Having center hole | Solid |
| Coating speed: | 6.3 mg/min | 3 |
| Thickness of layer: | 4.2 μm/min | 2 |
| Roughness of surface: | 12 μm Rmax | |

In the known method, it is known that a single discharge produced the melt-adhesion of the coating material which covers a circular region of diameter of about 10-30 μm. On the contrary, according to the method of the present invention, the region to be coated becomes elliptical since the coating material electrode is moved by amount 20–100 μm during the period of time when one discharge is being effected, i.e. in the pulse width Ton. Moreover, since the coating material electrode is apart from the workpiece surface while moving along it, the fused metal is rubbed and adhered on the workpiece surface, or is coated thereon; thus, it is prevented that the fused metal protrudes as if a thread were pulled when it moves away from the workpiece surface.

For this purpose, the coating material electrode is rotated at a speed from 500 to 6000 rpm in dependence upon its diameter or the like.

The melt-adhered portions produced due to each current pulse are piled up like fish scales, thereby forming a smooth, dense and rigid coated layer.

Although it is preferred to apply the additional motion to the coating material electrode by rotating the electrode, this can also be obtained by vibrating the electrode in a direction perpendicular to its axis. On the other hand, when applying the additional motion by the rotation, this rotation may be a regular single directional rotational motion, or it may be a vibrational rotational motion whose direction is periodically switched forwardly and reversely.

Furthermore, the power supply for discharge coating which is used to perform the process of the present invention is connected to the coating material electrode and workpiece, and it may include capacitor which is charged by a charging circuit having a fixed time constant, or a rectifier circuit to which the alternating current supplied from a commercially available power supply is supplied, and the like.

In addition, as an apparatus for vibrating an electode, it is possible to utilized a known vibration generating apparatus such as an eccentric cam, an electrostrictive or magnetostrictive vibrating apparatus, pneumatic type vibrating apparatus, etc., in lieu of the said vibration generating apparatus consisting of the above-described electromagnets and leaf spring.

It is obvious that the kind and shape of the coating material can be changed in accordance with the property and shape of the workpiece and the purpose of the coating.

Furthermore, although the multiple head and double housing type has been shown as an apparatus in the above embodiments, they may be the single head and open side type, and moreover, it can be of the type similar to a planar, lathe turning machine, boring machine, milling machine, etc. In addition, it can be the handheld type if necessary.

Although preferred embodiments of the invention are specifically illustrated and described herein, it will be appreciated that many modifications and variations of the present invention are possible in light of the above teachings and within the purview of the appended claims without departing from the spirit and intended scope of the invention.

What is claimed is:

1. In a method of forming a coating layer on a member to be coated, comprising the steps of placing an electrode of a coating material in opposing facing relation with the surface of the member to be coated with the coating material; applying a mechanical vibration to said electrode to cause the electrode to successively come into contact with and be removed from the surface of said member while supplying electrical current to the electrode and member thereby forming a coating layer on the surface of the member, the improvement comprising the steps of: applying to the coating material electrode an additional motion to cause the tip of the electrode to perform a sliding motion parallel to the surface of said member in addition to said mechanical vibration while supplying said current to the electrode and member, said electrode having a longitudinal central axis and said vibration being applied to said electrode in the direction of its longitudinal central axis, said additional motion being a rotational motion about an axis of rotation at a rotational speed of 500 to 6000 rpm, said electrode being devoid of material along said axis of rotation.

2. In a method of forming a coating layer on a member to be coated, comprising the steps of placing an electrode of a coating material in opposing facing relation with the surface of the member to be coated with the coating material; applying a mechanical vibration to said electrode to cause the electrode to successively come into contact with and be removed from the surface of said member while supplying electrical current to the electrode and member thereby forming a coating layer on the surface of the member, the improvement comprising the steps of: applying to the coating material electrode an additional motion to cuase the tip of the electrode to perform a sliding motion parallel to the surface of said member in addition to said mechanical vibration while supplying said current to the electrode and member, said electrode having a longitudinal central axis and said vibration being applied to said electrode in the direction of its longitudinal central axis, said additional motion being a rotational motion about an axis of rotation so that said electrode slides on the surface of said member during a period of time when the coating material electrode is in contact with the surface of said member for at least 10 μm, said electrode being devoid of material along said axis of rotation.

3. A surface treating method as claimed in claim 1 or 2, wherein the axis of rotation of said electrode is coincident with its longitudinal central axis and said electrode is formed as a tubular element.

4. A surface treating method as claimed in claim 1 or 2, wherein the axis of rotation of said electrode is coincident with its longitudinal central axis and the electrode is formed by a hollow central portion.

5. A surface treating method as claimed in claim 1 or 2, wherein the axis of rotation of said electrode is coincident with its longitudinal central axis and said electrode is formed by a plurality of thin wires secured together to form a hollow tube.

6. A surface treating method as claimed in claim 1 or 2, wherein, said additional motion further includes a vibrational motion which is perpendicular to said longitudinal central axis.

7. A surface treating method as claimed in claim 1 or 2 comprising elastically pressing said electrode against the surface of said member to produce a skipping motion in addition to said sliding motion.

8. A surface treating method as claimed in claim 1 or 2, wherein said electrode is caused to undergo a composite motion consisting of said vibration and said additional motion to apply the coating layer on said member in the form of overlapping fish scales.

9. A discharge coating apparatus comprising:
a base including upstanding columns;
a table movably mounted on said base and including means for supporting a member onto which a coating layer is to be applied;
first travelling means for moving said table;

a cross beam slidably supported by said columns;
second travelling means for moving said cross beam along said columns;
at least one machining head comprising a carriage supported by said cross beam for movement in a direction perpendicular to the direction of movement of said table; electrode attaching means on said carriage for supporting an electrode composed of the material to form the coating layer on said member, said electrode having a central longitudinal axis; electrode vibrating means for vibrating said electrode attaching means along the longitudinal axis of the electrode; means for rotating said electrode attaching means about an axis of rotation to apply an additional motion to said electrode attaching means in a direction perpendicular to the direction of vibration thereof without obstructing the motion of said electrode attaching means; said electrode being devoid of material along said axis of rotation; and current pulse to said electrode to effect discharge coating of said member by the material of said electrode while also supplying electrical power to said first and second travelling means, said electrode vibrating means and said means for applying additional motion to said electrode attaching means without obstructing the motion of said electrode attaching means; and
controller means for controlling the motions of said first and second travelling means and said machining head such that said electrode undergoes a composite movement comprising said vibration along the longitudinal axis of the electrode together with said additional motion whereas said table is moved to cause a coating layer of the material of the electrode to be applied to said member.

10. A discharge coating apparatus as claimed in claim 9, wherein said electrode vibrating means comprises an electromagnet and a leaf spring which rotatably holds said electrode attaching means and is attracted and vibrated by said electromagnet.

11. A discharge coating apparatus as claimed in claim 10, wherein said means for applying the additional motion comprises a motor connected to rotate said electrode attaching means, said axis of rotation being offset from said longitudinal axis of said electrode.

12. A discharge coating apparatus as claimed in claim 9, wherein said current supplying means comprises a DC power supply connected to said electrode and the member to be coated, a switching element in said DC power supply, and means for controlling said switching element.

13. A discharge coating apparatus as claimed in claim 9, wherein said current supplying means comprises a DC power supply, inductive coupling means having a primary side connected to said DC power supply and a secondary side connected to said electrode and the member to be coated and a switching element connecting the DC power supply to said primary side; and means for controlling said switching element.

14. A discharge coating apparatus comprising:
a base including upstanding columns;
a table movably mounted on said base and including means for supporting a member onto which a coating layer is to be applied;
first travelling means for moving said table;
a cross beam slidably supported by said columns;
a second travelling means for moving said cross beam along said columns;
at least one machining head comprising a carriage supported by said cross beam for movement in a direction perpendicular to the direction of movement of said table; a motor attached to said carriage and including an output shaft having an axis of rotation; electrode attaching means connecting an electrode thereof; elastic means connecting said electrode attaching means to the output shaft of said motor such that the electrode attaching means is driven in rotation around said axis of rotation of said output shaft; electrode vibrating means for vibrating said electrode attaching means, said electrode being devoid of material along said axis of rotation; and current supplying means for supplying a current pulse to said electrode to effect discharge coating of said member by the material of said electrode while also supplying electrical power to said motor and said electrode vibrating means without obstructing the motion of said electrode attaching means; and
controller means for controlling the operations of said first and second travelling means and said machining head such that said electrode undergoes a composite movement comprising said vibration along the longitudinal axis of the electrode together with said rotational motion whereas said table is moved to cause a coating layer of the material of the electrode to be applied to said member.

15. A discharge coating apparatus as claimed in claim 14, wherein said electrode vibrating means comprises one electromagnet and a leaf spring which rotatably holds said electrode attaching means and is attracted and vibrated by said electromagnet.

16. A discharge coating apparatus as claimed in claim 14, wherein said elastic means comprises a helical, torsional, coil spring which causes said electrode to undergo a skipping when the electrode comes into contact with the surface of the member to be coated while preventing transmission of vibration of the electrode to the motor.

17. A discharge coating apparatus as claimed in claim 14, wherein said elastic means comprises a volute spring which causes said electrode to undergo a skipping motion when the electrode comes into contact with the surface of the member to be coated while preventing transmission of vibration of the electrode.

18. A discharge coating apparatus as claimed in claim 14, wherein said current supplying means comprises a DC power supply connected to said electrode and the member to be coated, a switching element in said DC power supply, and means for controlling said switching element.

19. A discharge coating apparatus as claimed in claim 14, wherein said current supply means comprises a DC power supply, inductive coupling means having a primary side connected to said DC power supply and a secondary side connected to said electrode and the member to be coated and a switching element connecting the DC power supply to said primary side, and means for controlling said switching element.

20. A discharge coating apparatus comprising:
a bed;
a cross table movably mounted on said bed and including means for mounting a member onto which a coating layer is to be applied;
travelling means for moving said cross table;
a column upstanding on said bed;
an arm supported by said column;

a head comprising a housing supported by said arm for movement in a direction perpendicular to the direction of movement of said cross table; a motor attached to said housing, said motor including an output shaft having an axis of rotation; elastic means; a vibrating stem having a longitudinal axis, said stem being attached by said elastic means to the output shaft of said motor for rotation therewith around said axis of rotation; electrode attaching means on said stem for supporting an electrode composed of the material to form the coating layer on said member, said electrode being supported in said electrode attaching means and being devoid of material along said axis of rotation of said output shaft; vibrating means for applying vibration to said vibrating stem along its longitudinal axis without obstructing rotation of the vibrating stem; and current supplying means for supplying a current pulse to said electrode while also supplying electrical power to said motor and said vibrating means without obstructing the motion of said vibrating stem; and controller means for controlling the operations of said travelling means and said head.

21. A discharge coating apparatus as claimed in claim 20, wherein said vibrating means comprises at least one vibrating coil, and an iron core fixedly attached to said vibrating stem for being attracted to said vibration generating coil.

22. A discharge coating apparatus as claimed in claim 20, wherein said elastic means comprises a helical, torsion, coil spring which causes said electrode to undergo a skipping motion when said electrode comes into contact with the surface of the member to be coated while preventing transmission of vibration of the electrode to said motor.

23. A discharge coating apparatus as claimed in claim 20, wherein said elastic means comprises a volute spring which causes said electrode to undergo a skipping motion when said electrode comes into contact with the surface of the member to be coated while prventing transmission of vibration of the electrode to said motor.

24. A discharge coating apparatus as claimed in claim 20, wherein said current supplying means comprises a DC power supply connected to said electrode and the member to be coated, a switching element in said DC power supply, and means for controlling said switching element.

25. A discharge coating apparatus as claimed in claim 20, wherein said current supplying means comprises a DC power supply, inductive coupling means having a primary side connected to said DC power supply and a secondary side connected to said electrode and the member to be coated and a switching element connecting the DC power supply to said primary side; and means for controlling said switching element.

26. Apparatus for forming a coating layer on the surface of a member to be coated, said apparatus comprising means for supporting a member onto which a coating layer is to be applied, means for supporting, in confronting relation with said member, an electrode composed of the material of the coating layer to be applied to said member, means for providing relative movement between said electrode and said member which movement is composed of a reciprocal movement of the electrode towards and away from said member and an additional movement at an angle to said reciprocal movement such that the electrode periodically contacts and moves away from the surface of the member at an acute angle relative thereto, means for supplying electrical energy to said electrode during at least a portion of the periods of contact between the electrode and the surface member to cause melt adherence of the material of the electrode on the surface of the member, and means for providing further relative movement between the electrode and said member in a direction along the surface of the member to be coated so as to extend the melt adherence of the material of the electrode along a given region of the surface of the member, said reciprocal movement being perpendicular to the surface of the member to be coated and said additional movement being perpendicular to said reciprocal movement; said further relative movement being parallel to the surface of said member, said additional movement being a rotational movement of a rotational speed of 500 to 6000 rpm about an axis parallel to the direction of reciprocal movement between the electrode and the member, said electrode having a longitudinal axis and being devoid of material along the axis of rotational movement.

27. Apparatus for forming a coating layer on the surface of a member to be coated, said apparatus comprising means for supporting a member onto which a coating layer is to be applied, means for supporting, in confronting relation with said member, an electrode composed of the material of the coating layer to be applied to said member, means for providing relative movement between said electrode and said member which movement is composed of a reciprocal movement of the electrode towards and away from said member and an additional movement at an angle to said reciprocal movement such that the electrode periodically contacts and moves away from the surface of the member at an acute angle relative thereto, means for supplying electrical energy to said electrode during at least a portion of the periods of contact between the electrode and the surface member to cause melt adherence of the material of the electrode on the surface of the member, and means for providing further relative movement between the electrode and said member in a direction along the surface of the member to be coated so as to extend the melt adherence of the material of the electrode along a given region of the surface of the member, said reciprocal movement being perpendicular to the surface of the member to be coated and said additional movement being perpendicular to said reciprocal movement; said further relative movement being parallel to the surface of said member, said additional movement being a rotational movement of a rotational speed of 500 to 6000 rpm about an axis parallel to the direction of reciprocal movement between the electrode and the member wherein said electrode slides on the surface of said member due to said additional motion during a period of time when the electrode is in contact with the surface of said member for at least 10 $\mu$m, said electrode having a longitudinal axis and being devoid of material along the axis of rotational movement.

28. Apparatus as claimed in claim 26 or 27, wherein said rotational travel of said additional movement is angularly reciprocal.

29. Apparatus as claimed in claim 26 or 27 comprising elastic means acting on said electrode for urging the electrode towards said member.

* * * * *